Feb. 2, 1932. H. A. BORRESEN 1,843,596
FASTENER
Filed May 3, 1926 3 Sheets-Sheet 1
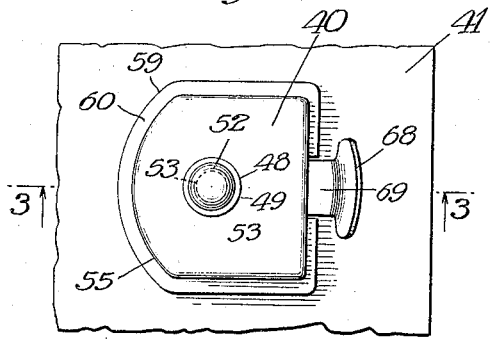
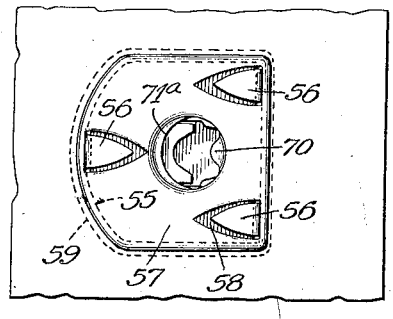
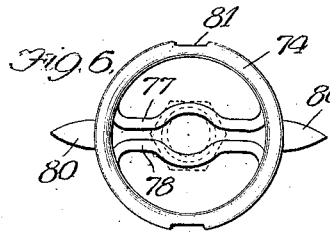
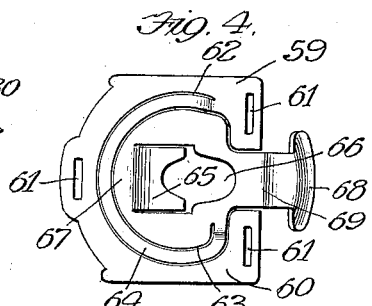
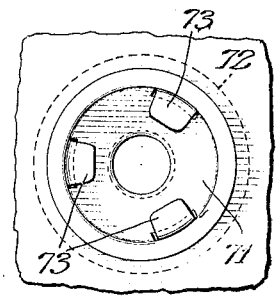
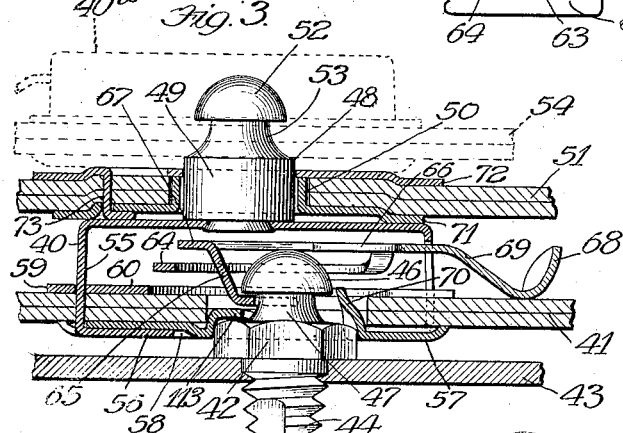
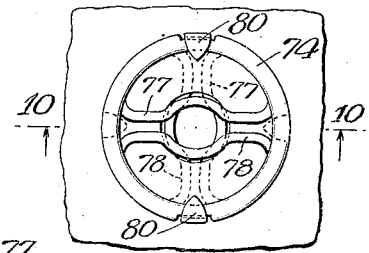
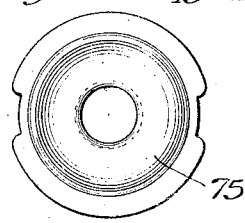
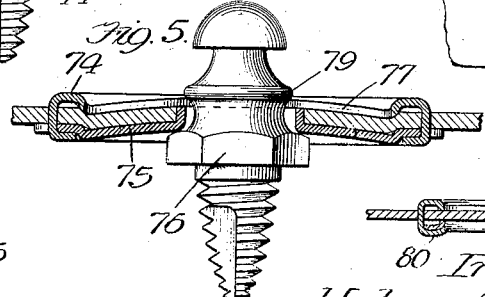
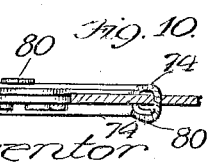
Witness
Martin H. Olsen
Inventor
Helge A. Borresen.
By Jabel & Banning
Attys.

Feb. 2, 1932.                H. A. BORRESEN                1,843,596
                                FASTENER
                           Filed May 3, 1926           3 Sheets-Sheet 2
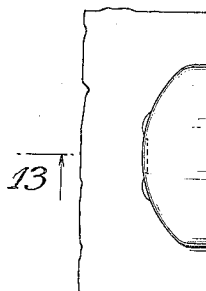
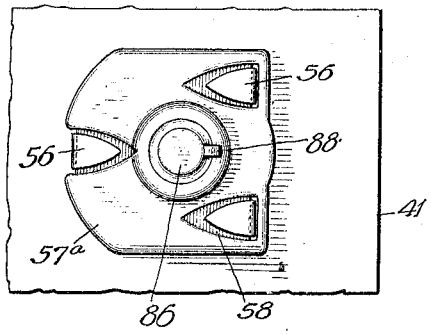
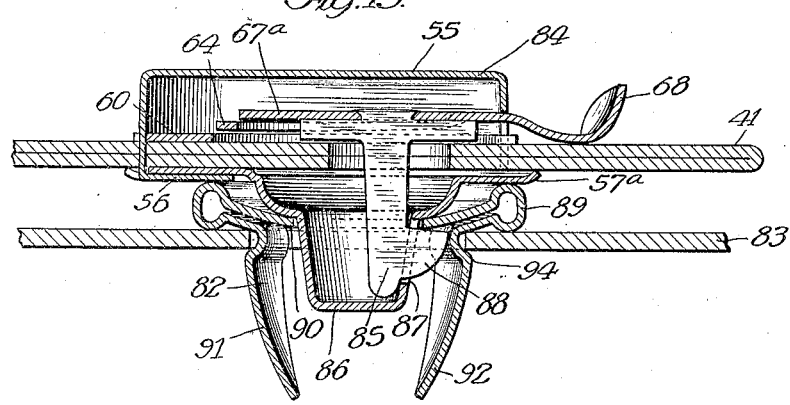
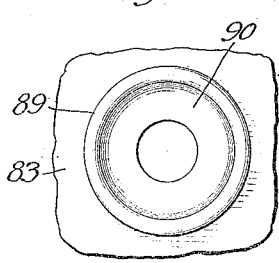
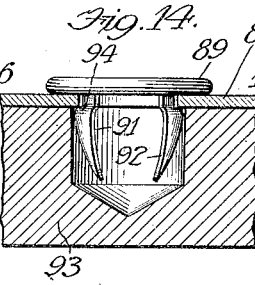
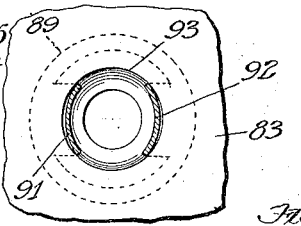
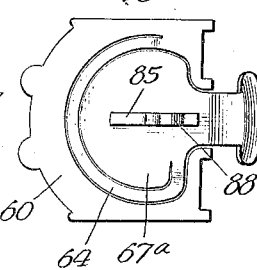
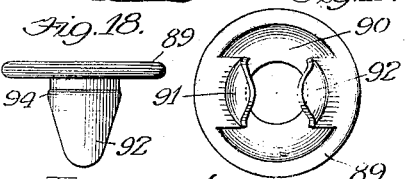

Feb. 2, 1932.  H. A. BORRESEN  1,843,596
FASTENER
Filed May 3, 1926  3 Sheets-Sheet 3
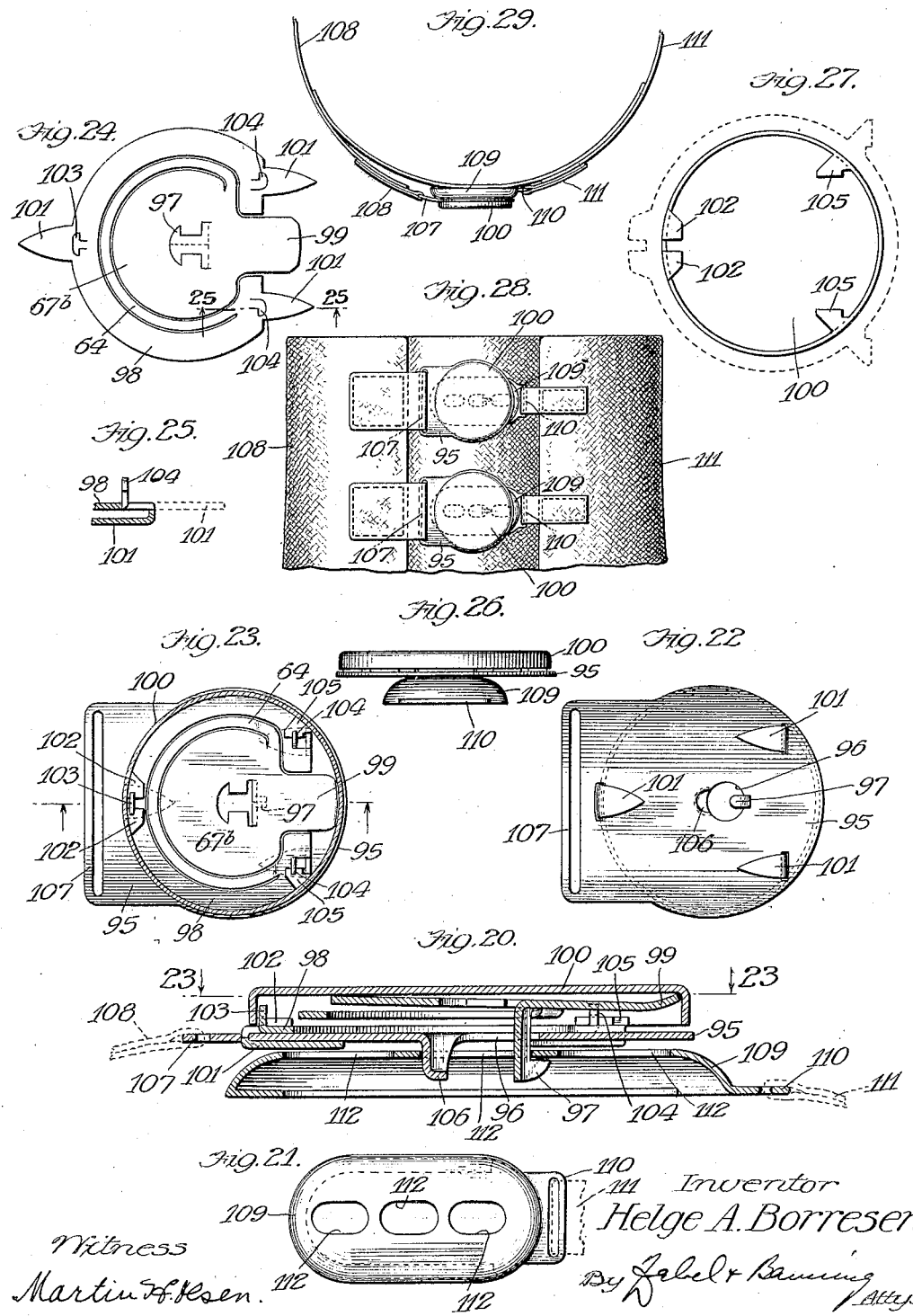

Patented Feb. 2, 1932

1,843,596

UNITED STATES PATENT OFFICE

HELGE A. BORRESEN, OF CHICAGO, ILLINOIS, ASSIGNOR TO UNITED-CARR FASTENER CORPORATION, OF CAMBRIDGE, MASSACHUSETTS, A CORPORATION OF MASSACHUSETTS

FASTENER

Application filed May 3, 1926. Serial No. 106,533.

My invention relates to latch fasteners and has for its object the provision of an improved and simplified device of this character. My invention contemplates the provision of a structure where, in its preferred form, two elements are necessary for its complete construction, these being the housing and the interior moving element. The housing is preferably made in two parts.

My invention further concerns itself with the provision of novel means cooperating with the spring fastener whereby to hold two elements together which are to be secured in position by the said fastening mechanism.

My invention further concerns itself with mechanism whereby a plurality of loose elements may be mounted in association with a retaining mechanism through the agency of my improved spring fastening means. It is also a prime object of my invention, so far as its preferred form is concerned, that the movable spring fastening element is integral with the supporting structure which carries it, the construction being such that ample and large spring action is obtained, which spring action is supplied by the material from which this element is made. In this connection, reference is made to my copending application, Serial No. 15,848, filed March 6, 1925 and my copending application Serial No. 607,345, filed December 16, 1922, my present invention being an improvement over the structures disclosed in said copending applications.

Further objects and advantages of my invention will appear from a specific description of several modifications thereof which I will now make in connection with the accompanying drawings illustrating such modifications in which—

Fig. 1 is a top view of one of my improved fasteners as mounted in place;

Fig. 2 is a bottom view thereof, the cooperating attaching element not being shown;

Fig. 3 is a sectional view on line 3—3 of Fig. 1 with the addition of means for holding an intermediately mounted grommet structure shown in full lines and with the addition shown in dotted lines of my improved fastener adapted to support the third ply of materials held by these structures;

Fig. 4 is a plan view of the composite support and latch;

Fig. 5 shows the cooperating stud for supporting my improved fastener, the same being shown in connection with a grommet but not in connection with the fastener;

Figs. 6 and 7 shows the two elements, respectively, which go up to make the grommet structure illustrated in Fig. 5;

Fig. 8 is a bottom view of the grommet shown in connection with Fig. 3;

Fig. 9 is a bottom view of a modified form of grommet;

Fig. 10 is a sectional view thereof on line 10—10 of Fig. 9;

Fig. 11 is a top view of a modified form of my improved fastener;

Fig. 12 is a bottom view thereof;

Fig. 13 is a sectional view on line 13—13 of Fig. 11, the fastener, however, being shown in connection with a flush type retainer;

Fig. 14 is a view similar to that of Fig. 13 in so far as the flush type retainer is concerned with the exception that the flush type retainer is not shown in section;

Fig. 15 is a top view of the structure illustrated in Fig. 14;

Fig. 16 is a sectional view on line 16—16 of Fig. 14;

Fig. 17 is a view similar to Fig. 4 of the modified form of latch mechanism shown in Fig. 13;

Fig. 18 is a side view of the retainer shown in Fig. 14 looking at right angles to the illustration of Fig. 14;

Fig. 19 is a bottom view of said retainer disassembled;

Fig. 20 is a sectional view of a modified form of fastening device;

Fig. 21 is a top view of a retaining mechanism applicable thereto;

Fig. 22 is a bottom view of the fastener as shown in Fig. 20;

Fig. 23 is a sectional view on line 23—23 of Fig. 20;

Fig. 24 is a detailed view of the composite latch and support therefor;

Fig. 25 is a sectional view on line 25 of Fig. 24;

Fig. 26 is an end view of the structure shown in Fig. 20;

Fig. 27 is a detailed view of the element cooperating with the element shown in Fig. 24;

Fig. 28 is a front view of two of my improved fasteners as shown holding together two flexible extremities of material; and Fig. 29 is a top view thereof.

Referring more particularly to Figs. 1, 2, 3 and 4, I show my improved fastener 40 as attached to a flexible piece of material 41, this fastener being adapted for attachment to the stud retainer 42 suitably mounted in place upon a base piece 43. The stud retainer is shown in this instance as being provided with screwthreads 44 and a cut away portion 45 by virtue of which it seats itself in the metal base strip 43 after a hole has been drilled therethrough. These particular features of the mounting of the said stud retainer form no part of my present invention. The stud retainer has a head 46 which surmounts a restricted portion or neck 47. My improved fastener has means, presently to be described, which cooperate with this head and neck portion whereby the parts 41 and 43 are held together when the parts 40 and 42 are placed in cooperating position or condition.

In the illustration shown in these figures, I have contemplated the possibility of a four-ply structure shown in Fig. 3 for which reason I have surmounted my improved fastener 40 with a stud 48, which stud is permanently fastened to the top portion of the fastener 40 and is provided with a cylindrical section 49 over which a grommet 50 may be placed, which grommet retains the third element 51 of the four-ply structure in place. The stud 48 then has a head 52 surmounting a restricted or neck portion 53 which is adapted to cooperate with a similar fastener 40a shown in dotted lines, but which is made without the stud 48, this fastener 40a being secured to the fourth element 54 of the four-ply structure and holding the same in place upon the stud 48. It will thus be seen that a stud fastener 42 is provided upon the base piece 43 by means of which my improved fastener 40 and a second element 41, may be held in place whereupon by means of the grommet 50, a third element 51 may be held in place upon the stud 48 and whereby a fourth element 54 may be held in place upon the stud 48 by the fastener 40a.

I have thus described in general the use to which my improved device may be put to indicate its flexibility and I will now describe more in detail the structure of the fastener.

This fastener comprises a casing 55, which is of the general outline shown in Figs. 1 and 2, this shell having three protruding fingers 56. This shell cooperates with a cap 57, the two parts 55 and 57 forming a complete closure, the shell 55 being mounted on top of the element 41 which it is to retain in place and the cap 57 being mounted beneath. The fingers 56 which project through the material of the element 41 are then bent over into the position shown in Figs. 2 and 3 and occupy recesses 58 in the cap 57.

The only other element needed in this particular embodiment of this invention to provide a complete spring or catch fastener, is the element 59 shown more in detail in Fig. 4. This element consists of a base plate or support 60 having three openings 61 through which the fingers 56 project. This element 60 further has two slots punched therethrough, respectively the slot 62 and the slot 63. These slots are merely shear slots and are made without punching away any of the material. In Fig. 4 it would seem that certain material has been punched away from these slots, although they are in reality merely sheared. The reason that this is shown in this manner is to facilitate understanding of the device and to illustrate more clearly the structure.

By virtue of these two slots 62 and 63, there is provided a spring tongue 64 which, as will be seen, extends throughout more than 180° about the periphery of the central latch tongue 65, presently to be explained. This latch tongue 65 is punched downwardly out of the body of the material, a certain portion of the material being entirely punched away to leave the opening 66. The latch tongue 65 is carried upon the central plate 67, which central plate extends outwardly in the form of a finger piece 68 which is an extension of the arm 69. The material of which the element 59 is made is spring-like in nature and serves as a spring when thinned to the dimensions of the tongue 64.

Now after the shear slots 62 and 63 have been made in the material, the tongue 65 is bent downwardly and the arm 69 and finger piece 68 are also bent downwardly (the fingers 68 being then again bent to extend upwardly), but the plate 67 is pushed upwardly so that it occupies the position shown in Fig. 3 with the tongue 64 lying intermediate between the plate 67 and the base plate 60. It will thus be seen that the latch tongue 65 being carried by the plate 57 will be moved to the left (Fig. 3) whenever the finger piece 65 is moved toward the left. In this manner, this latch tongue 65 cooperates with the head 46 of the stud retainer 42. In assembling, the plate 60 lies on top of the material 41 and is held in position as stated by the fingers 56 passing through the openings 61. A very simple latch fastener is thus provided consisting practically of two elements, the latch element and the housing. In actual practice, these two elements are made in three parts, that is, the housing is made in two parts consisting of the shell and cap as heretofore explained. The latch fastener itself is made of one piece of material which provides the spring latch fastener, the spring mounting, the finger piece and the supporting base plate. A very good spring action is obtained by reason of the fact that the spring extends throughout almost a complete convolution, permitting a substantially straight line movement of the latch.

The cap 57 is provided with an upwardly extending lip 70 which helps to guide the structure into place when the same is being mounted on the retainer and which also prevents rearward movement of the entire fastener whenever the finger piece 68 is pushed to the left (Fig. 3). I have already described that the housing 55 carries a second stud 48 adapted to receive the third ply 51 of material to be superposed and that this same stud 48 may also retain a fourth element 54, which element 54 is shown as being provided with my improved fastener 40a, this fastener 40a not having a stud similar to the stud 48, but showing probably the most universal way in which my fastener will be constructed.

In order to secure the element 51 in position, it is provided with a grommet consisting of two parts, respectively the eyelet portion 71 and the cap portion 72, the cap portion 72 having fingers 73 to retain the two parts together. This grommet cooperates with the cylindrical portion 49 of the stud 48 and is finally definitely held in its position when the fastener 40a is mounted in position. In Figs. 5, 6, 7, 9, and 10, I have shown a modified form of grommet device, Figs. 5, 6 and 7 showing a grommet structure having two cooperating elements, respectively the elements 74 and 75, these being shown as mounted in place upon a stud fastener 76 in Fig. 5.

The element 74 has two transverse arms 77 and 78 punched from the body of the material which are spring-like in nature and which are adapted to encircle the ridge 79 provided upon the stud fastener 76, thus more securely to hold the grommet in position. In Figs. 9 and 10, I have shown a modification of these structures in that instead of using one element 74 as shown in Fig. 6, I use two such elements, the same being held together by prongs 80 which are adapted to enter slots 81 provided in the companion elements. These prongs are shown in Figures 6, 9, and 10. Fig. 6 shows one single member 74 with prongs 80 not yet bent to apply to fastening the member 74. In Figs. 9 and 10 the way in which the prongs are bent is clearly shown.

In Figs. 11, 12, and 13 I show a modified form of structure capable of use in connection with a flush retainer. This flush retainer 82 is mounted upon a base plate 83 and my improved fastener 84, which is similar in form to that shown in Fig. 3, is however, modified to the extent that instead of having the catch tongue 65 which is adapted to cooperate with a protruding head, there is provided a catch 85 which is adapted to enter into the flush retainer 82 to hold the parts together. The construction of the parts is similar in many respects and I have numbered the shell portion of the structure 55 but have numbered the cap 57a because it is slightly different than the cap structure 57 of Fig. 3. The cap 57a has a downwardly extending pocket 86 within which the catch 85 is located. An opening 87 is provided through which the nose piece 88 of the catch protrudes in order to come into cooperative relation with the flush type retainer. The catch 85 in the form shown in Fig. 13, is riveted to the base plate 67a. From this it will be seen that my improved structure lends itself not only for use in connection with a stud type of fastener, but also with the flush type.

The details of the interior mechanism of Figs. 11, 12, and 13 is more clearly shown in Fig. 17. The flush type of retainer is shown more clearly in Figs. 13, 14, 15, 16, 18, and 19, and is preferably made of one piece of material consisting of the rim 89 having the inwardly projecting annular dished retaining element 90 and having two downwardly extending prongs 91 and 92. This flush type of fastener is usually inserted through a metal base plate such as the base plate 83, which metal base plate is sometimes backed up with a wooden backing 93. When only the metal plate is used, then it is merely necessary to cut out a hole in order to insert my improved retainer. It is then held permanently and will not come loose.

I obtain this result by having the prongs 91 and 92 conform to a circular outline, having a larger diameter than the diameter of the hole 93 through which they project. This is clearly seen from an inspection of Fig. 16 where the opposing sharp edge of the prongs rest against the inner periphery of the hole 93, but the intermediate portions of the prongs 91 and 92 do not rest against this inner wall portion forming the hole 93. The prongs adjust themselves into position and are thereby retained firmly in place. The prongs have shoulders 94 which hold them in position as is clearly apparent.

In Fig. 20 I have shown my improved structure as applied to a fastener in which the finger piece 68 shown in Figs. 12 and 13 does not project, but in which the arrangement is such that the casing or shell of the fastener is itself, moved in order to secure disengagement between the parts. In Fig. 20 is shown a base plate 95 which has an opening 96 through which the catch 97 projects, in which opening it is slidable. This base plate 95 cooperates with a plate 98 which is shown more clearly in Fig. 23 and which plate is formed to provide the tongue 64 heretofore described, and which tongue is again associated with the plate portion 67b carrying the catch 97. An operating finger 99 is provided which, however, in this instance, is not manipulated directly by hand, but is manipulated by a movable shell portion 100. The plate 98 is held in close juxtaposition to the base plate 95 by means of the fingers 101. It will thus be seen that the plate 98 and the base plate 95 form a rigid structure carrying the movable catch 97 which may be moved whenever the operating finger 99 is moved.

Now, in order to move this finger, I utilize the shell structure 100 and this shell structure is mounted in place by having two protruding fingers 102 and 102 which cooperate with a struck up headed guide 103 extending upwardly from the plate 98. Two other headed guides 104 and 104 are struck up from the plate 98 and engage inwardly projecting slides 105 provided upon the shell portion 100. When the parts are first mounted together, the operating finger 99 is pushed to the left as far as it will go, whereupon the cap 100 is inserted into place so that its elements 102 and 105 may be seated directly to the elements 103 and 104 whereupon a return of these parts toward the right will cause the parts 102 and 105 to ride into place under the headed elements 103 and 104 to thus complete the structure as shown in Fig. 20. The parts thereafter need never again be moved so far to the left and in practice are not, because the movement of the shell portion 100 to the left to disengage the parts is merely a small fraction of the total movement required to disengaged the parts 102 and 103. A lip 106 is struck downwardly from the plate 95, the purpose of which will be presently explained.

My improved fastener is provided with any suitable retaining mechanism such as the link 107 to hold the material 108 which it is desired to fasten into position. The fastener cooperates with the retainer 109, in this case being shown as provided with a similar link 110 to obtain the very extremity of the material 111 which it is desired to hold in position. This retainer 109 has three openings, 112 which are adapted to be engaged by the catch 97 so that the two parts may be adjusted to requirements. The lip 106 theretofore referred to, cooperates with one edge of these holes 112 to prevent the entire fastener moving to the left when the shell 100 is moved to the left to disengage the catch 97 from its cooperating inner surface of the hole 102.

In Figs. 28 and 29 I have shown my improved fasteners as being applied to an overshoe, for instance, to illustrate the manner in which my improved fastener may be used.

Fig. 27 illustrates a side view of the structure shown in Fig. 20.

An important supporting flange 113 shown in Fig. 3 is provided upon the back plate 57 against which the latch 65 may impinge whenever there is a pull exerted against said latch by the stud retainer 42.

From what has been thus described, the nature of my invention will be readily clear to those skilled in the art and it will also be clear that many modifications may be made without departing from the spirit thereof and what I therefore claim as new and desire to claim by Letters Patent is:

1. In a fastener of the character described the combination with a housing, of a latch structure co-operating therewith, said structure comprising a latch carrying element, a support, and a spring connecting said element and support, said element, support, and spring being integral and made of a single piece of material, said support being fixed relative to said housing.

2. In a fastener of the character described the combination with a housing, of a latch structure co-operating therewith, said structure comprising a latch carrying element, a latch, a support, and a spring connecting said element and support, said element, latch, support, and spring being integral and made of a single piece of material.

3. In a fastener of the character described the combination with a housing, of a latch structure co-operating therewith, said structure comprising a latch carrying element, a depending latch, a support, and a spring connecting said element and support, said element, depending latch, support, and spring being integral and made of a single piece of material.

4. In a fastener of the character described the combination with a housing, of a latch structure co-operating therewith, said structure comprising a latch carrying element, a support, and a spring connecting said element and support, said element, support, and spring being integral and made of a single piece of material, said element and support by virtue of the spring connection between them being relatively movable.

5. In a fastener of the character described the combination with a housing, of a latch structure co-operating therewith, said structure comprising a latch carrying element, a support, and a circular spring connecting said element and support, said element, support, and spring being integral and made of a single piece of material, said support being rigidly secured to said housing.

6. In a fastener of the character described the combination with a housing, of a latch structure co-operating therewith, said structure comprising a latch carrying element, a latch, a support, and a circular spring connecting said element and support, said element, latch, support, and spring being integral and made of a single piece of material, said support being rigidly secured to said housing.

7. In a fastener of the character described the combination with a housing, of a latch structure co-operating therewith, said structure comprising a latch carrying element, a support forming a base plate for said housing, and a spring of considerable length connecting said element and support, said element, support, and spring being integral and made of a single piece of material.

8. In a fastener of the character described the combination with a housing, of a latch structure co-operating therewith, said structure comprising a latch carrying element, a support, and a spring connecting said element and support, said element, support, and spring being integral and made of a single piece of material, said element and support by virtue of the spring connection between them being relatively movable, and means provided upon said housing and support to prevent movement of said support when said element is moved relatively to said support.

9. In a fastener of the character described the combination with a housing, of a latch structure co-operating therewith, said structure comprising a latch carrying element, a support, and a spring connecting said element and support, said element, support, and spring being integral and made of a single piece of material, said element, support, and spring lying in different planes.

10. In a fastener of the character described the combination with a housing, of a latch structure co-operating therewith, said structure comprising a latch carrying element, a depending latch, a support, and a spring connecting said element and support, said element, depending latch, support, and spring being integral and made of a single piece of material, said element, support, and spring lying in different planes.

11. In a fastener of the character described the combination with a housing, of a latch structure co-operating therewith, said structure comprising a latch carrying element, a support, and a spring connecting said element and support, said element, support, and spring being integral and made of a single piece of material, said element and support by virtue of the spring connection between them being relatively movable, said element, support, and spring lying in different planes.

12. In a fastener of the character described the combination with a housing, of a latch structure co-operating therewith, said structure comprising a latch carrying element, a support, and a circular spring connecting said element and support, said element, support, and spring being integral and made of a single piece of material, said element, support, and spring lying in different planes.

13. In a fastener of the character described the combination with a housing, of a latch structure co-operating therewith, said structure comprising a latch carrying element, a finger piece therefor, a stationary support, and a spring connecting said element and support, said element, finger piece, support, and spring being integral and made of a single piece of material.

14. In a fastener of the character described the combination with a housing, of a latch structure co-operating therewith, said structure comprising a latch carrying element, a finger piece therefor, a latch, a support fixedly mounted in said housing, and a spring connecting said element and support, said element, finger piece, latch, support, and spring being integral and made of a single piece of material.

15. In a fastener of the character described the combination with a housing, of a latch structure co-operating therewith, said structure comprising a latch carrying element, a finger piece therefor, a depending latch, a support, and a spring connecting said element and support, said element, finger piece, depending latch, support, and spring being integral and made of a single piece of material.

16. In a fastener of the character described the combination with a housing, of a latch structure co-operating therewith, said structure comprising a latch carrying element, a finger piece therefor, a support fixedly mounted in said housing, and a spring connecting said element and support, said element, finger piece, support, and spring being integral and made of a single piece of material, said element and support by virtue of the spring connection between them being relatively movable.

17. In a fastener of the character described the combination with a housing, of a latch structure co-operating therewith, said structure comprising a latch carrying element, a finger piece therefor, a support, and a circular spring connecting said element and support, said element, finger piece, support, and spring being integral and made of a single piece of material, said support being interlocked with said housing.

18. In a fastener of the character described the combination with a housing, of a latch structure co-operating therewith, said structure comprising a latch carrying element, a finger piece therefor, a latch, a support, and a circular spring connecting said element and support, said element, finger piece, latch support, and spring being integral and made of a single piece of material, said support extending across said housing and forming a base plate for said housing.

19. In a fastener of the character described the combination with a housing, of a latch structure co-operating therewith, said structure comprising a latch carrying element, a finger piece therefor, a support forming a wall of said housing, and a spring connecting said element and support, said element, finger piece, support, and spring being integral and made of a single piece of material, said finger piece projecting outwardly through said housing.

20. A separable fastener comprising, in combination, a socket presenting a stud-receiving aperture, a cooperating stud presenting a shank portion for passage through said aperture, a locking portion projecting through a slot at one side of said shank portion for locking the stud to the socket, attaching means for securing the stud to a flexible support, and means cooperating with the locking portion extending substantially parallel to the flexible support, whereby it may be associated with the locking portion and operated by initial movement of the flexible support relative to said stud thereby to shift said locking portion out of locking engagement with the socket and separate the stud from the socket.

21. A separable fastener comprising, in combination, a socket having a stud-receiving aperture surrounded by a wall, a shoulder back of said wall and means for securing the socket to a support, a cooperating stud secured to a flexible carrying medium and having a shank portion for entrance into the aperture in said socket, a latch projecting through a slot at one side of said shank portion for engagement behind said shoulder to lock the stud and socket together and means extending substantially parallel to the flexible carrying medium and cooperating with the latch whereby it may be operated by initial movement of the flexible carrying medium relative to the stud to withdraw said latch from engagement with said shoulder thereby to permit separation of the stud and socket.

22. A separable fastener stud including a casing having a projection for engagement in a stud-receiving aperture of a cooperating socket, means assembled with the casing and having a plate-like portion, an offset locking portion spaced from the general plane of the plate-like portion and spaced from the casing for engagement in the stud-receiving aperture of a socket, a spring portion formed integral with said plate-like portion and contained within said casing and an operating finger portion forming part of the means assembled with the casing, said operating finger extending laterally from the periphery of said casing to provide means for operating said offset locking portion to disengage it from a cooperating socket.

23. A three-side lock fastener comprising, in combination, a socket having a stud-receiving aperture, a cooperating stud presenting a non-resilient portion for passage into said aperture, attaching means for securing said non-resilient portion to a flexible support, means assembled with the stud and having a hook-like latch for locking the stud and socket against separation by an outward strain on the flexible support at three sides, and a depending finger associated with said means which presents the hook-like latch and extending substantially parallel with the flexible support thereby to be operable by an initial outward pull on the flexible support at the fourth side to release the hook-like latch and permit separation of the stud from the socket.

24. A separable fastener member including a casing for attachment to a carrying medium, means assembled with the casing and having a plate-like portion located entirely within the casing, a locking portion extending from said plate-like portion at substantially a right angle thereto and having a shoulder spaced from the general plane of the plate-like portion for engagement with a cooperating snap fastener member to secure the snap fastening members together, a spring portion formed integral with said plate-like portion and contained within said casing in substantially the same plane as the plate-like portion, and an operating finger portion forming part of the means assembled with the casing, said operating finger portion extending laterally from the plate-like portion outside the periphery of the casing to provide means for operating said locking portion thereby to disengage it from the cooperating fastener member, said plate-like portion and spring portion being adapted to be located at the same side of the carrying medium when the casing is attached.

In witness whereof, I hereunto subscribe my name this 22d day of April, A. D. 1926.

HELGE A. BORRESEN.